United States Patent [19]

Warnock

[11] Patent Number: 4,492,289
[45] Date of Patent: Jan. 8, 1985

[54] INTERNAL SHOE DRUM BRAKE

[75] Inventor: Robert J. Warnock, Solihull, England

[73] Assignee: Lucas Industries Limited, Birmingham, England

[21] Appl. No.: 319,713

[22] Filed: Nov. 9, 1981

[30] Foreign Application Priority Data

Dec. 30, 1980 [GB] United Kingdom ............... 8041500

[51] Int. Cl.³ ............................................. F16D 65/58
[52] U.S. Cl. ...................... 188/79.5 GE; 188/79.5 K; 188/196 B
[58] Field of Search .................. 188/79.5 R, 79.5 GE, 188/79.5 GT, 79.5 K, 79.5 SC, 79.5 SS, 196 F, 196 B, 196 BA, 196 V; 192/111 A; 74/577 R, 577 M

[56] References Cited

U.S. PATENT DOCUMENTS

| 3,016,990 | 1/1962 | Towns | 188/79.5 K |
| 3,339,678 | 9/1967 | Burnett | 188/196 B |
| 4,121,701 | 10/1978 | Gestkoff | 188/196 B |

FOREIGN PATENT DOCUMENTS

| 1528428 | 4/1968 | France | 188/79.5 GT |
| 2397566 | 3/1979 | France | 188/79.5 GE |
| 2419432 | 10/1979 | France | |
| 1084413 | 9/1967 | United Kingdom | |
| 1410514 | 10/1975 | United Kingdom | |
| 1414942 | 11/1975 | United Kingdom | |
| 1443352 | 7/1976 | United Kingdom | |
| 1443351 | 7/1976 | United Kingdom | |
| 1481377 | 7/1977 | United Kingdom | |
| 2004606 | 4/1979 | United Kingdom | 188/196 B |
| 1546869 | 5/1979 | United Kingdom | |
| 2090352 | 7/1982 | United Kingdom | 188/79.5 GE |
| 727904 | 4/1980 | U.S.S.R. | 188/79.5 K |

Primary Examiner—Bruce H. Stoner, Jr.
Assistant Examiner—R. R. Diefendorf
Attorney, Agent, or Firm—Holman & Stern

[57] ABSTRACT

An internal shoe drum brake incorporates an automatic adjuster which includes and adjuster element carried by one of the brake shoes, a strut extending between the shoes and engaged by the adjuster element and a rotary adjuster cam mounted on the same shoe as the adjuster element, or a parking brake lever pivoted on the shoe, the cam engaging the adjuster element in a non-rotatable manner. When the shoes are separated for braking, excess shoe separation causes the adjuster element to be disengaged from the cam so that the cam is rotated by a spring to re-engage the adjuster element and thereby establish a retracted position of the shoes.

3 Claims, 6 Drawing Figures

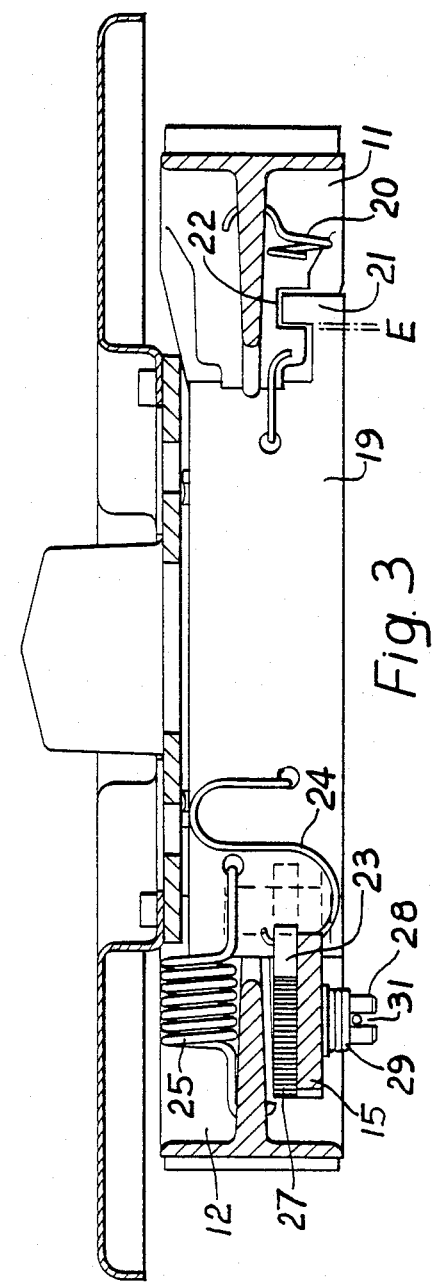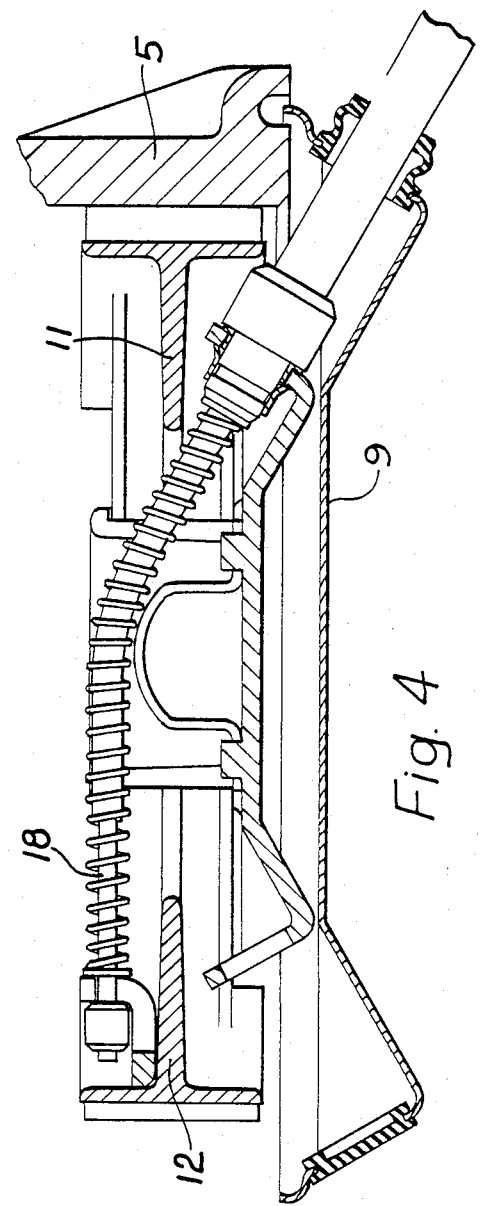

INTERNAL SHOE DRUM BRAKE

BACKGROUND OF THE INVENTION

This invention relates to an internal shoe-drum brake, primarily for a motor vehicle, incorporating an automatic adjuster operable to take up excessive shoe to drum clearance.

DESCRIPTION OF THE PRIOR ART

It has already been proposed to provide a shoe drum brake in which a strut extends between the brake shoes and an adjuster element engages one end of the strut to maintain a predetermined maximum shoe to drum clearance by regulating the spacing between the shoes, the adjuster element having teeth on a peripheral surface thereof and being held in a desired adjusting position by a pawl or similar means engaging with the teeth.

In one prior proposal of this general kind illustrated in U.S. Pat. No. 3,016,990, the adjuster element is a cam device mounted on a hand brake lever, which is itself pivotally mounted on one of the brake shoes, the cam device being controlled by a pawl which is pivotally mounted on the shoe which carries the hand brake lever and engages ratchet teeth formed on the cam device. The adjuster operates when a retracting spring acting between the shoes is stretched beyond its design limit by excess outward shoe movement, the effect of this being to create clearance between the cam device and strut which is taken up by rotation of the cam device to hold the shoes in a new retracted position. This arrangement is generally unsatisfactory in that a reliable adjustment action dependent upon the over-stretching of a spring can be difficult to achieve.

A further prior proposal of the aforesaid general kind is illustrated in British Pat. No. 1084413 and embodies an adjuster lever and a pawl, both pivotally mounted on the same brake shoe. The adjuster lever extends generally perpendicularly to the strut and has teeth on its free end remote from its pivot point which co-operate with the pawl. These teeth are subject to substantial shear forces and must therefore be relatively large in order to provide secure locking of the lever. However, teeth which are large enough to sustain the shear forces would give rise to too large an adjustment increment if placed too near to the strut and a long lever is used in order to provide an acceptable adjustment increment. With such an arrangement, the lever is of such a length that its free end swings inwardly close to the central hub region of the brake when the shoes are fully adjusted. When a relatively large space is available in the central or hub region of the brake, the use of a long adjusting lever can be acceptable. In relatively small diameter brakes, or in brakes used on vehicles employing relatively large modern wheel bearings, the space available in the central or hub region can be insufficient to permit the use of a long adjuster lever.

BRIEF SUMMARY OF THE INVENTION

An object of the present invention is to provide an internal shoe drum brake employing an automatic adjuster which includes a strut extending between the brake shoes and which is simple and effective in operation and less subject to the aforesaid space constraints.

According to the present invention, an internal shoe drum brake comprises an actuator arranged and operable to cause separation of the shoes into braking engagement with the drum against the action of shoe return spring means, an adjuster element carried by one of the shoes, a strut extending between the shoes and engaging said one shoe by extending between the shoes and engaging said one shoe by way of the adjuster element so that the spacing between the shoes is dependent upon the position of that element, the strut being constrained to follow outward movement of the other shoe, and a rotary adjuster cam carried by said one shoe and normally engaged with the adjuster element in non-rotatable manner, the arrangement being such that, when, upon operation of said actuator, outward movement of the shoes exceeds a predetermined value, the strut and adjuster element move with the other shoe, tending to separate the adjuster element and cam, whereupon the cam is urged to rotate in a direction such as to re-engage said element and cam and thereby set a new retracted position of the shoes when the actuator is deactivated.

In one convenient arrangement, the adjuster element is spring urged into engagement with the strut and may conveniently be a lever pivotally mounted on said one shoe. Rotation of the cam when engaged with the adjuster element may conveniently be prevented by inter-engagement of respective toothed surface portions of the adjuster element and cam.

Preferably, the cam is spring urged to rotate in said direction and this may conveniently be achieved by the provision of a torsion spring preferably surrounding a pin upon which the cam element is rotatably mounted.

The brake may conveniently be provided with a mechanical actuator lever for use as a hand brake or parking actuator, the lever being conveniently pivoted on one of the shoes for mechanical operation via a cable or other linkage, and acting on the other shoe via the strut.

When the brake incorporates a mechanical actuator, the cam may conveniently be mounted on the actuator lever. When this arrangement is employed, the adjuster element is preferably mounted on a common pivot with the actuating lever.

BRIEF DESCRIPTION OF THE DRAWINGS

The invention will now be described, by way of example, with reference to the accompanying drawings in which:

FIG. 3 is a cross-sectional view taken on the line III—III of FIG. 2;

FIG. 4 is a cross-sectional view taken on the line IV—IV of FIG. 2;

DETAILED DESCRIPTION

Figure 1:
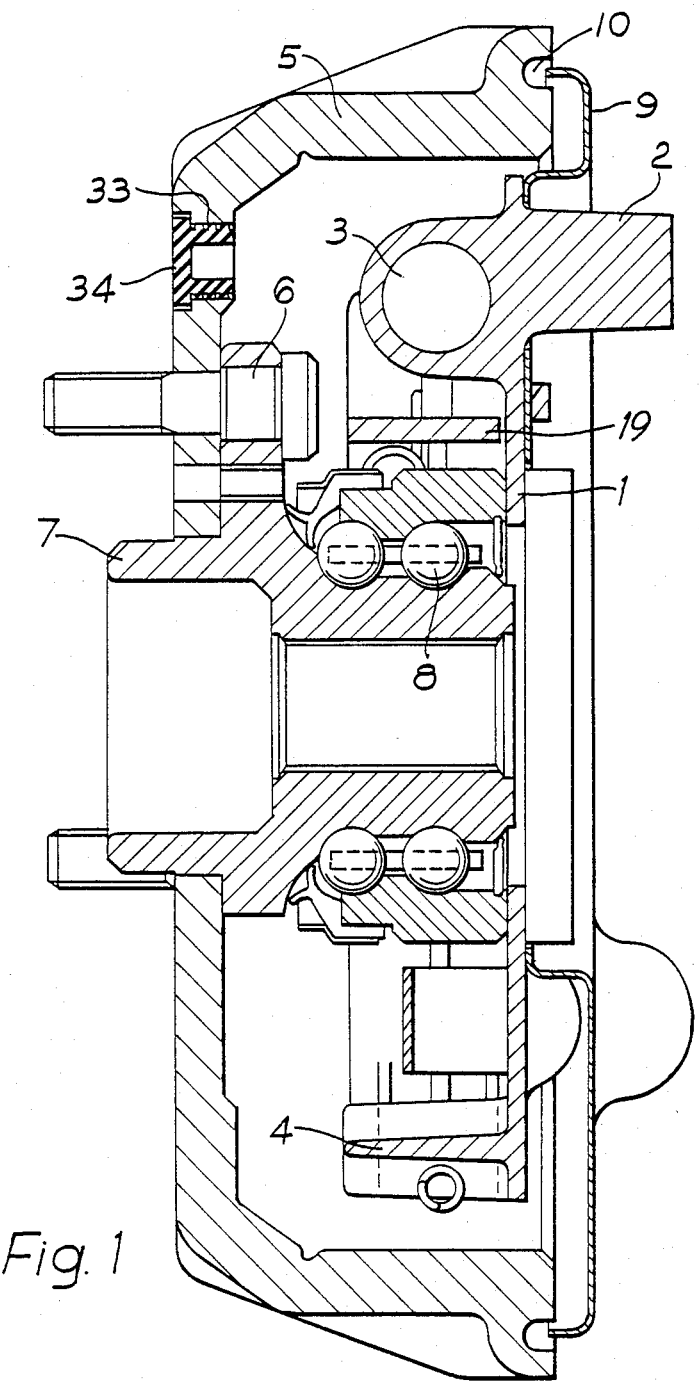
FIG. 1 is a cross-sectional view taken along the line I—I of FIG. 2.

Referring first to FIG. 1 of the drawings, this shows one form of the drum brake of the invention which has a torque plate 1 formed integrally, in a peripheral region thereof, with a body 2 which includes an hydraulic brake actuating cylinder 3. The torque plate 1 is also formed integrally, at a peripheral location thereof diametrically opposed to the body 2, with an abutment member 4. The torque plate 1, body 2 and abutment 4 are preferably formed by casting, typically from aluminium.

The brake also includes a brake drum 5 secured by bolts 6 to a wheel-carrying hub 7, the bolts 6 also serving to secure a road wheel (not shown) to the hub. The hub 7 is rotatably mounted relative to the torque plate by way of a bearing 8. A dust cover 9 is secured to the rear face of the torque plate and is shaped to co-operate with a groove 10 formed in a peripheral edge of the drum 5 in order to preclude the ingress of foreign material to the interior of the drum.

Figure 2:
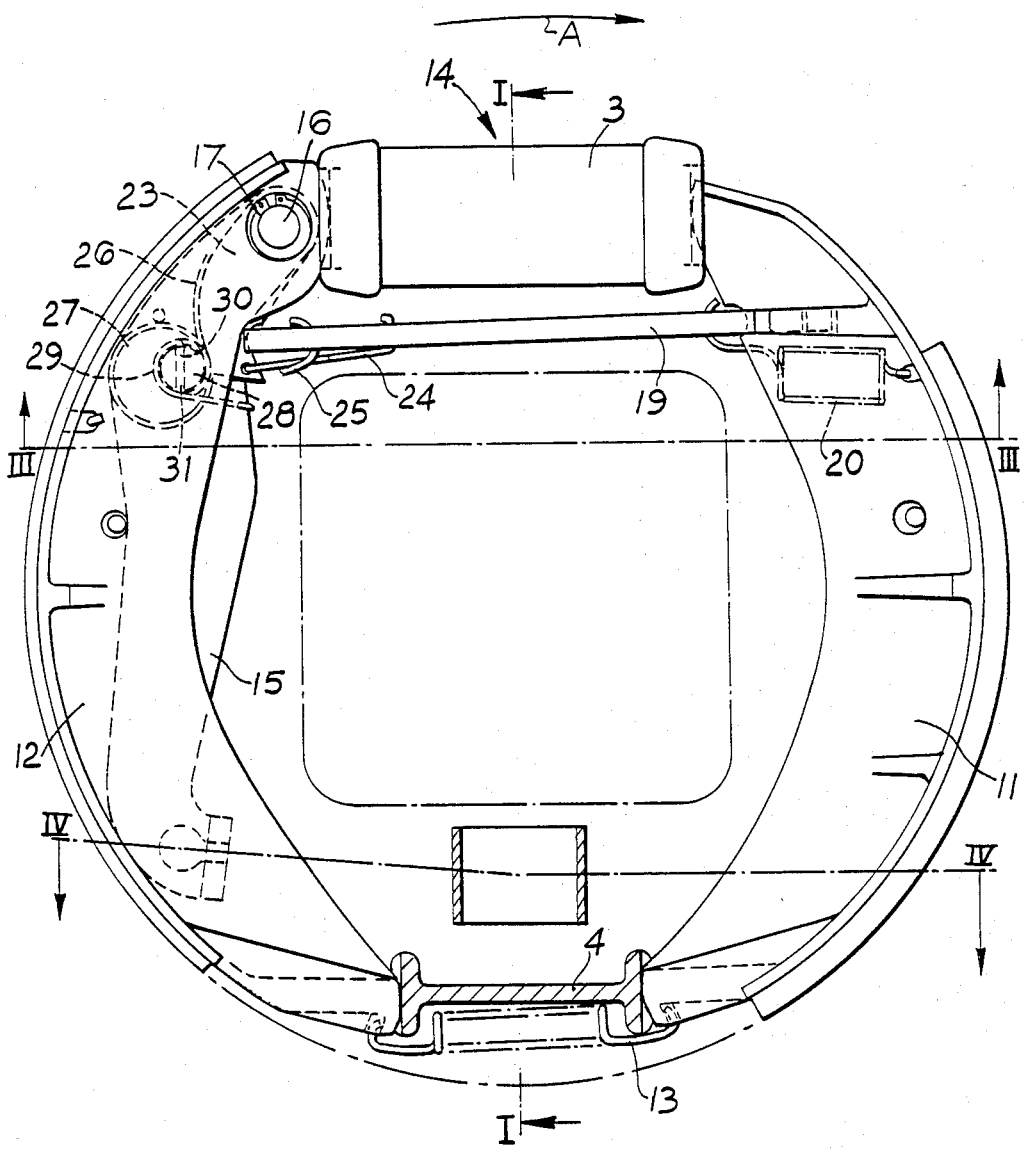
FIG. 2 is a view from the left hand side of FIG. 1 with the brake drum, wheel hub and bearings removed.

FIGS. 2 to 4 illustrate the interior of the brake with the drum removed, the normal direction of rotation of the drum being indicated by the arrow A. The brake includes a pair of brake shoes 11, 12, one pair of adjacent ends of which are held in engagement with the abutment 4 by a spring 13 extending between the shoes and the other pair of adjacent ends which co-operate with an hydraulic actuator 14 built into the cylinder 3 and operable to effect separation of the shoes into contact with the brake drum. Alternative actuation of the shoes can be effected by means of a hand brake lever 15 which is pivoted on the shoe 12 by means of a pin 16 and retained by a circlip 17. The hand brake lever 15 bears on the strut 19 and is actuated by a cable 18 (FIG. 4) in conventional manner, the lever being moved angularly in a counter-clockwise direction, when viewed in FIG. 2, about the pin 16 in order to actuate the brake.

A flat plate-like strut 19 extends between the shoes and is urged into abutment against the shoe 11 by means of a spring 20. As will be seen from FIG. 3, the strut is provided with a hooked extension 21 which engages within a slot 22 in the shoe 11 and arranged to have a predetermined clearance with the shoe at E, which acts to set a predetermined maximum shoe to drum running clearance, as will become apparent hereinafter.

An adjuster lever 23 is carried by the shoe 12, being in this embodiment pivotally mounted on the hand brake lever pivot pin 16 and urged into engagement with the other end of the strut 19 by means of a generally S-shaped spring 24. A spring 25, of greater strength than the spring 20 acts between the strut and shoe 12 to serve as a shoe return spring.

An outer surface portion 26 of the adjuster lever 23 is serrated to form teeth which normally mesh with corresponding teeth formed on a circular cam 27 eccentrically mounted on the hand brake lever 15 by way of a pivot pin 28 with which the cam is fast for rotation. A torsion spring 29 surrounds the pin 28 and is anchored at one end to the hand brake lever and at the other end to the pin 28 by engagement of a bent-over portion 30 of the spring engaging in a slot 31 formed in the pin. In the inoperative condition of the brake as illustrated in FIG. 2, the adjuster lever 23 and hand brake lever 15 are urged against the strut by the springs 24 and 25 respectively and the teeth on the adjuster lever and cam are urged firmly into engagement to prevent any relative movement between these two components.

Service actuation of the brake is effected by operation of the hydraulic actuator 14 which separates the shoes against the drum. Since the spring 25 is stronger than the spring 20, outward movement of the shoe 11 will extend the spring 20 slightly until the clearance E is taken up, whereupon engagement of the shoe with the hooked extension 21 of the strut causes the strut to follow the shoe 11 during its continued movement. As the strut moves with the shoe 11 (to the right as seen in FIG. 2), the adjuster lever 23, which bears on the left-hand end of the strut is constrained by the spring 24 to pivot about the pin 16 to follow the strut movement.

Since the cam 27 is mounted on the hand brake lever, which is carried by the shoe 12, separation of the shoes will tend to relieve the force derived from the spring 25 which, when the brake is non-operative, tends to urge the cam and adjuster lever firmly into engagement. Thus, any outward movement of the shoes greater than the running clearance permitted by the clearance E will tend to separate the cam and adjuster lever. When this occurs, the cam will be rotated by the action of the torsion spring 29 on the eccentric cam pivot pin 28, to an extent determined by re-engagement of the teeth on the cam and adjuster lever. The effect of this is that, when the shoes are retracted to their inoperative positions, the adjuster lever will be held by the cam in a new angular position such that the effective length of the strut is increased to set a newly adjusted position for the shoes. Any excess shoe outward movement is thereby taken up.

After a long period of service, grooving of the drum can occur and this can preclude removal of the drum unless the adjuster can be actuated from the exterior of the drum to allow the shoes to retract. For this purpose, an opening 33 is provided through the outwardly facing drum wall and normally closed by a plug 34. When it is desired to retract the adjuster, the plug is removed and a screw-driver or the like inserted to engage the slot 31 of the cam pivot pin 28. By operating the cylinder 3 to separate the shoes, the adjuster is relieved of the force of the spring 25 and the cam can be turned in its reverse direction against the action of the torsion spring 29 to permit full retraction of the shoes and thereby enable the drum to be withdrawn.

Figure 5:
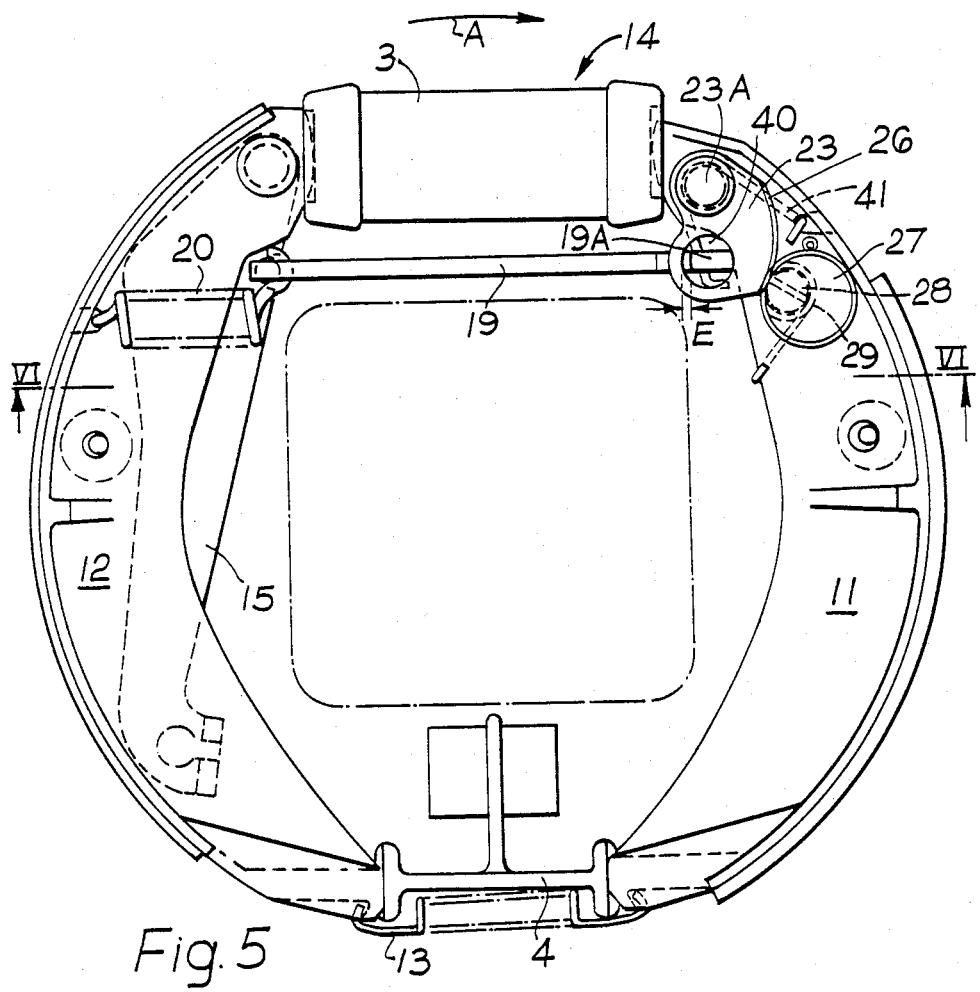
FIG. 5 is a view, similar to FIG. 2, of an alternative embodiment of the brake of the invention.
Figure 6:
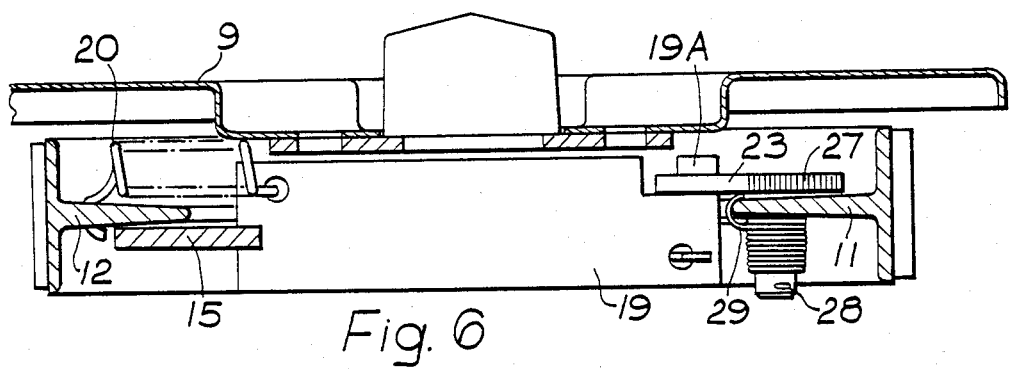
FIG. 6 is a cross-sectional view taken along the line VI—VI of FIG. 5.

An alternative embodiment of the brake of the invention is shown in FIGS. 5 and 6 of the drawings, in which the reference numerals of FIGS. 1 to 4 are used to designate those parts which are equivalent in both embodiments. The hand brake lever 15 is pivotally mounted on the shoe 12 and engages the left hand end of the strut, as viewed in the drawing. The adjuster lever 23 is pivotally mounted at 23A on the shoe 11 adjacent to the actuator 3 and has an external peripheral toothed portion 26. The shoe 11 also carries the externally toothed cam 27 which is rotatably mounted thereon and cooperates, as before, with a torsion spring 29 surrounding the pin 28, the spring being anchored at one end to the pin 28, and at its other end to the shoe. The lever 23 has an opening 40 through which extends a laterally projecting tongue 19A of the strut 19. The extremity of the strut nearest to the shoe 11 bears upon the internal wall of the opening 40 and the opposed edge of the tongue is spaced from that wall by a distance E which sets the maximum shoe to drum running clearance of the shoes. It would alternatively be possible to dispense with the opening 40, in which case a peripheral surface portion of the lever would bear on the adjacent end of the strut and the other end of the strut could be provided with a hooked extension engaging within a slot in the shoe 12 in a manner similar to the hooked extension 21 and slot 22 illustrated in FIG. 3.

The spring 20 in this embodiment urges the strut 19 against the hand brake lever 15 so that the strut is always constrained to follow outward movement of the shoe 12 which carries the lever. A shoe return spring 41 acts between the shoe 11 and the strut, being a weaker spring than the spring 20.

Operation of the adjuster is very similar to that described previously. When the shoes are separated by operation of the actuator 3, the strut 19 will move with the shoe 12 under the action of the spring 20 and the lever 23 will move in the opposite direction with the shoe 11. The adjuster will remain inoperative until the clearance E is taken up, whereupon additional outward shoe movement resulting from shoe lining wear will cause the tongue 19A of the strut to pivot the lever 23 in a clockwise direction, tending to separate the lever and cam 27, the cam then being rotated by the action of the spring 29 in order to re-engage the teeth on the cam and adjuster lever, as described in connection with the previous embodiment. Thus, when the shoes are retracted to their inoperative positions, the adjuster lever will be held by the cam in a new angular position such that the effective length of the strut is increased to set a newly adjusted position for the shoes.

The hand brake lever of the embodiment of FIGS. 5 and 6 may be dispensed with in a further alternative form of the brake which would be particularly suitable for use as a front wheel brake. In such a brake, the strut 19, whilst engaging one of the shoes by way of the lever 23 as before, would engage directly with the other shoe under the action of the spring 20.

It will be seen that in all of the embodiments described, the load line passing through the location of engagement between the strut and adjuster lever passes very close to the location of engagement between the lever and cam, so that the teeth on the lever and cam are predominantly in compression with only a small shearing force applied thereto, which means that the teeth may be relatively small, as for example in the nature of knurling. It is thus possible for the lever 23 to be short compared with some conventional arrangements so that it encroaches less upon the central area of the brake, making it particularly suitable for brakes of small diameter and those used with relatively large modern wheel bearings.

It will be understood that the various components of the brake and its adjuster need not be exactly as depicted. For example, the invention can be applied to a brake having a conventional torque plate and separate cylinder. The cylinder may be replaced by other conventional forms of pneumatic, hydraulic or mechanical shoe separation means. The shapes of the adjuster element and cam may be varied to suit requirements. For example the cam may be of segmental shape rather than circular. The adjuster element may be mounted for sliding, rather than pivotal movement. When a pivoting element is used in a brake incorporating a hand brake lever, the lever pivot may be separate from the hand brake lever pivot.

I claim:

1. A self-adjusting shoe drum brake comprising an actuator operably connected to the shoes to move them apart into braking engagement with the drum; shoe return spring means operably connected to said shoes to retract said shoes out of engagement with the drum when said actuator is deactivated; an automatic adjuster element movably mounted on one of the shoes; a strut extending between the shoes and engaging said one shoe via said adjuster element so that the spacing between the shoes in the retracted position is dependent upon the position of said adjuster element with respect to said one shoe; a spring connected at one end to said strut and at the other end to said adjuster element to resiliently urge said adjuster element and said strut into engagement with each other; a helical spring connected at one end to said strut and at the other end to said other shoe to urge said strut and other shoe toward each other to constrain said strut to follow outward movement of the other shoe; a rotatable adjuster cam mounted on said one shoe; means to resiliently urge said cam to rotate; an additional helical spring connected at one end to said strut and at the other end to said one shoe to resiliently urge said cam into engagement with said adjuster element; cooperating means on said cam and adjuster element to prevent rotation of said cam when in engagement with said adjuster element; and means to provide limited free play of said strut upon separation of said shoes by said actuator for controlling the desired clearance between said shoes and drum in the retracted position comprising a slot in said other shoe, a hook shaped extension on said strut interfitting in said slot, and a gap between said extension and one side of said slot when in said retracted position, said extension and said slot extending substantially perpendicular to the direction of movement of said strut when the brake is actuated, and said gap being on the side of said extension opposite to the direction of movement of said other shoe when actuated; so that, when outward movement of the shoes by said actuator exceeds a predetermined value, the strut and adjuster element are displaced by said other shoe to disengage the adjuster element from the cam and the cam is rotated in a direction to re-engage said adjuster element and thereby set a new retracted position of the shoes when the actuator is deactivated.

2. A self-adjusting shoe drum brake comprising: an actuator operably connected to the shoes to move them apart into braking engagement with the drum; shoe return spring means operably connected to said shoes to retract said shoes out of engagement with the drum when said actuator is deactivated; an automatic adjuster element pivotally mounted on one of the shoes by a pivot pin; a strut extending between the shoes and engaging said one shoe via said adjuster element so that the spacing between the shoes in the retracted position is dependent upon the position of said adjuster element with respect to said one shoe; a torsion spring mounted on said pivot pin and connected at one end to said one shoe and at the other end to said strut to resiliently urge said adjuster element and said strut into engagement with each other and said cam into engagement with said adjuster element; means to constrain said strut to follow outward movement of the other shoe; a rotatable adjuster cam mounted on said one shoe; means to resiliently urge said cam to rotate; cooperating means on said cam and adjuster element to prevent rotation of said cam when in engagement with said adjuster element; and means to provide limited free play of said strut upon separation of said shoes by said actuator, said free play controlling the desired clearance between said shoes and drum in the retracted position, comprising an opening in said adjuster element, a hook shaped extension on said strut interfitting in said opening, and a gap between said extension and one side of said opening when in said retracted position, said hook shaped extension extending substantially perpendicular to the direction of movement of said strut when the brake is actuated, said gap being on the side of said extension opposite to the direction of movement of said one shoe, and the other side of said extension engaging the other side of said opening in the retracted position; so that, when outward movement of the shoes by said actuator exceeds a predetermined value, the strut and adjuster element are displaced by said other shoe to disengage the adjuster element from the cam and the cam is rotated in a direction to re-engage said adjuster element and thereby set a new retracted position of the shoes when the actuator is deactivated.

3. A brake as claimed in claim 2 wherein said means to constrain said strut comprises a helical spring connected at one end to said strut and at the other end to said other shoe.

* * * * *